(12) United States Patent
Miedema et al.

(10) Patent No.: US 11,561,790 B2
(45) Date of Patent: Jan. 24, 2023

(54) ORCHESTRATING MULTI-LEVEL TOOLS FOR THE DEPLOYMENT OF A NETWORK PRODUCT

(71) Applicant: Ciena Corporation, Hanover, MD (US)

(72) Inventors: David Miedema, Ottawa (CA); Aaron Gregory Seilis, Ottawa (CA); Hadiuzzaman Dewan, Kanata (CA)

(73) Assignee: Ciena Corporation, Hanover, MD (US)

( * ) Notice: Subject to any disclaimer, the term of this patent is extended or adjusted under 35 U.S.C. 154(b) by 58 days.

(21) Appl. No.: 17/353,032

(22) Filed: Jun. 21, 2021

(65) Prior Publication Data
US 2022/0405092 A1 Dec. 22, 2022

(51) Int. Cl.
| G06F 8/71 | (2018.01) |
| G06F 9/445 | (2018.01) |
| G06F 8/60 | (2018.01) |

(52) U.S. Cl.
CPC .............. *G06F 8/71* (2013.01); *G06F 8/60* (2013.01); *G06F 9/44526* (2013.01)

(58) Field of Classification Search
None
See application file for complete search history.

(56) References Cited

U.S. PATENT DOCUMENTS

| 7,995,569 B2 | 8/2011 | Ashwood-Smith |
| 8,364,036 B2 | 1/2013 | Boertjes et al. |
| 9,060,215 B2 | 6/2015 | Miedema |
| 9,258,190 B2 | 2/2016 | Swinkels et al. |
| 9,485,013 B2 | 11/2016 | Al Sayeed et al. |
| 9,686,176 B2 | 6/2017 | Traxler et al. |
| 9,819,565 B2 | 11/2017 | Djukic et al. |
| 10,440,128 B2 | 10/2019 | Miedema |
| 10,680,739 B2 | 6/2020 | Swinkels et al. |
| 10,715,888 B2 | 7/2020 | Swinkels et al. |
| 10,735,837 B1 | 8/2020 | Al Sayeed et al. |
| 10,797,818 B1 | 10/2020 | Croskery et al. |
| 10,891,176 B1 | 1/2021 | Miedema |
| 10,958,993 B2 | 3/2021 | Swinkels et al. |

(Continued)

FOREIGN PATENT DOCUMENTS

WO 2021030170 A1 2/2021

OTHER PUBLICATIONS

Hegedus, "A DevOps Approach for Cyber-Physical System-of-Systems Engineering through Arrowhead" May 2021, IEEE (Year: 2021).*

*Primary Examiner* — Hossain M Morshed
(74) *Attorney, Agent, or Firm* — Lawrence A. Baratta, Jr.

(57) ABSTRACT

Systems, methods, and computer-readable media for embedding configuration data in a product for deployment in a network are provided. A method, according to one implementation, includes the step of establishing a toolchain for generating configuration data to be embedded in a product to be deployed in a network. The toolchain can include a plurality of production levels. The method also includes the step of employing a plurality of plug-in modules, where each plug-in module is configured to operate at one of the production levels for orchestrating one or more external production tools at the respective production level. Also, the method includes the step of permitting bi-directional communication among the plug-in modules to coordinate the configuration data at the plurality of production levels.

20 Claims, 7 Drawing Sheets

(56) References Cited

U.S. PATENT DOCUMENTS

| | | | |
|---|---|---|---|
| 10,972,359 B2 | 4/2021 | Miedema et al. | |
| 10,985,838 B1 | 4/2021 | Al Sayeed et al. | |
| 10,992,374 B1 | 4/2021 | Miedema et al. | |
| 2018/0032322 A1* | 2/2018 | Jagannath | G06F 8/60 |
| 2018/0349108 A1* | 12/2018 | Brebner | G06F 8/311 |
| 2020/0252307 A1 | 8/2020 | Miedema | |
| 2020/0387357 A1* | 12/2020 | Mathon | G06F 9/4411 |
| 2021/0042172 A1* | 2/2021 | Miedema | G06F 9/546 |
| 2021/0042173 A1* | 2/2021 | Prakash | G06F 9/546 |
| 2021/0075877 A1 | 3/2021 | Miedema et al. | |
| 2021/0173718 A1* | 6/2021 | Patel | G06F 40/295 |
| 2021/0182107 A1* | 6/2021 | Kwon | G06F 9/5077 |
| 2022/0091857 A1* | 3/2022 | Chivukula | G06F 9/44505 |

* cited by examiner

|  | PRODUCT #1 | PRODUCT #2 |
|---|---|---|
| Build System | In-house (using Perl bundle file parser) | Yocto (Open Source) |
| Version Control | Repo tool | Multiple (repo, lineup, hard coded commit) |
| Operating System | VxWorks | Linux |
| Life Cycle Management (LCM) | Custom startup code | Systemd (Open Source) |
| NBI | REST, NETCONF | NETCONF |
| Target | SIM / HW | SIM / HW |

ORCHESTRATING MULTI-LEVEL TOOLS FOR THE DEPLOYMENT OF A NETWORK PRODUCT

TECHNICAL FIELD

The present disclosure generally relates to microservices provided in networking systems. More particularly, the present disclosure relates to orchestrating multiple tools for building and deploying a product within a network.

BACKGROUND

Generally, telecommunication networks include server devices, client devices, and other network infrastructure, whereby businesses can provide services or microservices to customers. In some cases, equipment for providing services and microservices can be distributed throughout a system. The value of disaggregated microservices may include offering a microservice where its only interface is a messaging interface, fault-tolerance across devices, independent operation (add/remove services dynamically), Simpler service implementation; less integration, etc. Microservices may be independent of each other (e.g., from a lifecycle perspective), but may still be dependent on other services and Application Programming Interfaces (APIs) as needed. Also, a single microservice can be started, stopped, and upgraded as needed. Some information may need to be handled and coordinated between multiple services. Therefore, microservices may care about and be dependent on the events of other related microservices.

The microservices can interact with other microservices as part of a greater deployment of equipment and/or software within the network. In some cases, asynchronous notifications may be shared among microservices (e.g., publication/subscription (pub/sub) type notifications, validation notifications, notifications related to the staging of data, etc.). Also, various microservices can be written in any programming/software language, use any database technology, and can be stored in any suitable source control environment. Microservices can also be integrated on any platform with different build systems, package delivery mechanisms, test environment (Continuous integration and continuous Development (CICD)), etc.

For example, a developer (e.g., software developer, service provider, server, etc.) can have the option of making certain development choices for a microservice being developed. One option is language (e.g., how the microservice is implemented in software, firmware, middleware, etc.). Another option is the library system (e.g., how the microservice is stored and what version is used). The developer may also be able to choose an option of a "build system" (e.g., how the microservice is built), another option for dependency management (e.g., how the various dependencies are managed), options regarding testing (e.g., test harness information, how is microservice tested, etc.), "lifecycle management" (e.g., how the microservice reacts to other resources in a deployment), can choose its own database technology. among other possibilities.

The process of building and deploying microservices in a build system depends on the platform on which the microservice is to be used. For example, various development choices with respect to "platform" may include the build system selected (e.g., how the microservice system is built), dependency management (e.g., how the runtime/build time dependencies are managed), Continuous Integration (CI) (e.g., how is the system built and versioned), test harness (e.g., how the system is tested), package delivery (e.g., how the system is deployed), Lifecycle Management (e.g., how the system starts and evolves), among other possibilities.

Also, a developer may have many options to select from with respect to both services and platforms. For example, selecting a language may include options such as C, C++, Python, Java, Go, Rust, JavaScript, etc. Selecting Source Code Management Systems may include options such as git, perforce, mercurial, ClearCase, CVS, RCS, subversion, or a custom system. Also, Build and Build Orchestration Systems may include options such as Make, Autotools, CMake, BitBake, SCons, Premake, PyBuilder, Maven, Ant, NPM, webpack, etc. Dependency Management may include options such as configure, libtool, #include, import, requirements.txt, pom.xml, find_package( ) DEPENDS, package.json, etc. Continuous Integration (CI) may include options such as TeamCity, Jenkins, Bamboo, gitlab, etc. Package Delivery mechanisms may include options such as rpm, deb, Puppet, Chef, Ansible, Docker, Kubernetes, etc. Lifecycle Management may include options such as init.d, docker, Systemd, upstart, openrc, Kubernetes, etc.

However, the selections of a service are not mutually exclusive with the platform. For example, if a service stores its code in git, the platform must be able to download the code from git. If a service uses Autotools to configure and build, the platform must be able to support that build system or the service needs to support multiple build system and service needs to make sure all supported build configurations are uniform across multiple builds.

With the platform and deployment choices, the integration of any product into the system or network can require a lot of work. Also, these integration scripts can have various issues, such as being too brittle, opaque, hard to maintain, rigid, etc. Furthermore, many of the same tasks and data might be needed for each product to be deployed, which therefore may include duplicated efforts on the part of the developer. Thus, changing deployment options can at times be more work than writing the entire services themselves. The overlap between the service and the platform is typically managed by a large variety of complex, arcane and brittle configuration files and scripts needed to bridge the gaps and connect the dots between the platform build requirements and the service requirements for different builds.

A given deployment typically has a "release configuration" that describes in a specific way how to fetch, build, install, and package the components of the build. Any time a new deployment is needed, a lot of work needs to be done to create and manage new software glue for that deployment. All of this work is typically for a given platform and cannot be easily shared between platforms since multiple platforms will usually have different requirements. Any configuration data is also typically driven by build time config into the service build stages. This means that a service built for one configuration is not easily cached or ported to another configuration without a new build.

Therefore, there are many shortcomings with respect to the conventional way of developing a product to be deployed in a system. Also, additional shortcomings of conventional systems are described here. For example, all the portions of the current workflow and toolchain that do not involve modifiable configuration data represent major impediments to the ability to easily support, change, and integrate service deployments with platforms. Conventional systems do not allow for new deployments to be constructed without significant work in the build system scripts or configurations. Every new build system on every new platform would require the developer to do the same work to integrate with the various services. Also, migrating between build systems or different versions of systems can be problematic since build system input files need to be reconstructed every time. Data that could possibly be shared between runtime and build time is not shared in conventional systems since the representations of that data in the build engines are specific to the platform and build system.

Other shortcomings of the conventional systems include the idea that configuration changes to a deployment are not typically understood by the build system. Each platform may have its own rules for integration and deployment that need to be catered to by DevOps to support services. For example, DevOps refers to the combination of software development (Dev) and Information Technology (IT) operations (Ops). One goal of DevOps is to reduce development life cycle while providing high quality software. Also, there is no easy way for default deployment data stored in a service to be overridden by platform dependent deployment data (e.g., number of threads, memory and logging specifics, database location, messaging ports and restrictions, licensing, etc.). If deficiencies are found in an element of a conventional build system, and an alternative is found, the inertia of moving to a better system may be so large to make it not worth the effort.

In the field of developing and deploying products into a network, the conventional systems include a number of disadvantages. Therefore, there is a need in this field to overcome the deficiencies of the conventional systems and provide systems and methods for more efficiently configuring and deploying products, from the start of a deployment cycle (e.g., build) to an end of the deployment cycle (e.g., lifecycle management).

BRIEF SUMMARY

The present disclosure is directed to systems, methods, and non-transitory computer-readable media for enabling orchestration of an entire deployment process including at least build tools, testing tools, implementation tools, deployment tools, and runtime management and monitoring tools. A non-transitory computer-readable medium, according to one implementation, may be configured to store computer logic having instructions that, when executed, enable a processing device to establish a toolchain for generating configuration data to be embedded in a product to be deployed in a network. The toolchain may include a plurality of production levels. The instructions may further enable the processing device to employ a plurality of plug-in modules, where each plug-in module is configured to operate at one production level of the plurality of production levels for orchestrating one or more external production tools at the respective production level. Also, the instructions enable the processing device to permit bi-directional communication among the plug-in modules to coordinate the configuration data at the plurality of production levels.

According to some implementations, the non-transitory computer-readable medium may be defined whereby the configuration data includes microservice code for enabling the product to offer one or more microservices in the network. Also, the above-mentioned toolchain may be a deployment orchestration tool including at least a build tool and a runtime tool. Also, the deployment orchestration tool may further include one or more of a testing tool, a packaging tool, a deployment tool, an installation tool, a configuration tool, and a service life cycle management tool.

Furthermore, the instructions may further enable the processing device to receive a declarative configuration and orchestrate the plug-in modules at the production levels to produce the configuration data based on the declarative configuration. The instructions may further enable the processing device to reuse the configuration data to be embedded in a plurality of products to be deployed in the network to allow the plurality of products to share build engine data. The instructions may also enable the processing device to maintain a common look and feel on each product. In some embodiments, the toolchain may be a part of a DevOps pipeline.

The instructions may further enable the processing device to generate the configuration data to unify one or more of cross-platforms, libraries, configurable packages, programming languages, build tools, orchestration tools, dependency tools, software development tools, Continuous Integration (CI) tools, and runtime configuration management tools under a common configuration model. The instructions further enable the processing device to select services and platforms based on build, dependency management, test harness, Life Cycle Management (LCM), languages, source code management, build orchestration, and package delivery. The configuration data can be used to generate a customized load. For example, as suppose the same software release bundle to all customers is provided to multiple customers, it is possible to a customized bundle based on the deployment need. This may simply the licensing need.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for developing and deploying various products into service within a communications network. As mentioned above, configuration data of conventional systems is typically driven by build time config into the service build stages, which means that a service built for one configuration is not easily cached or ported to another configuration without a new build. However, the present disclosure provides embodiments for making the deployment data-driven with plug-in-based controllers, which can allow deployments to be easily reproduced in different build systems. For example, a plug-in, as described in the present disclosure, may be an add-in or add-on software component that adds a specific feature to an existing computer program to enable customization.

Figure 1:
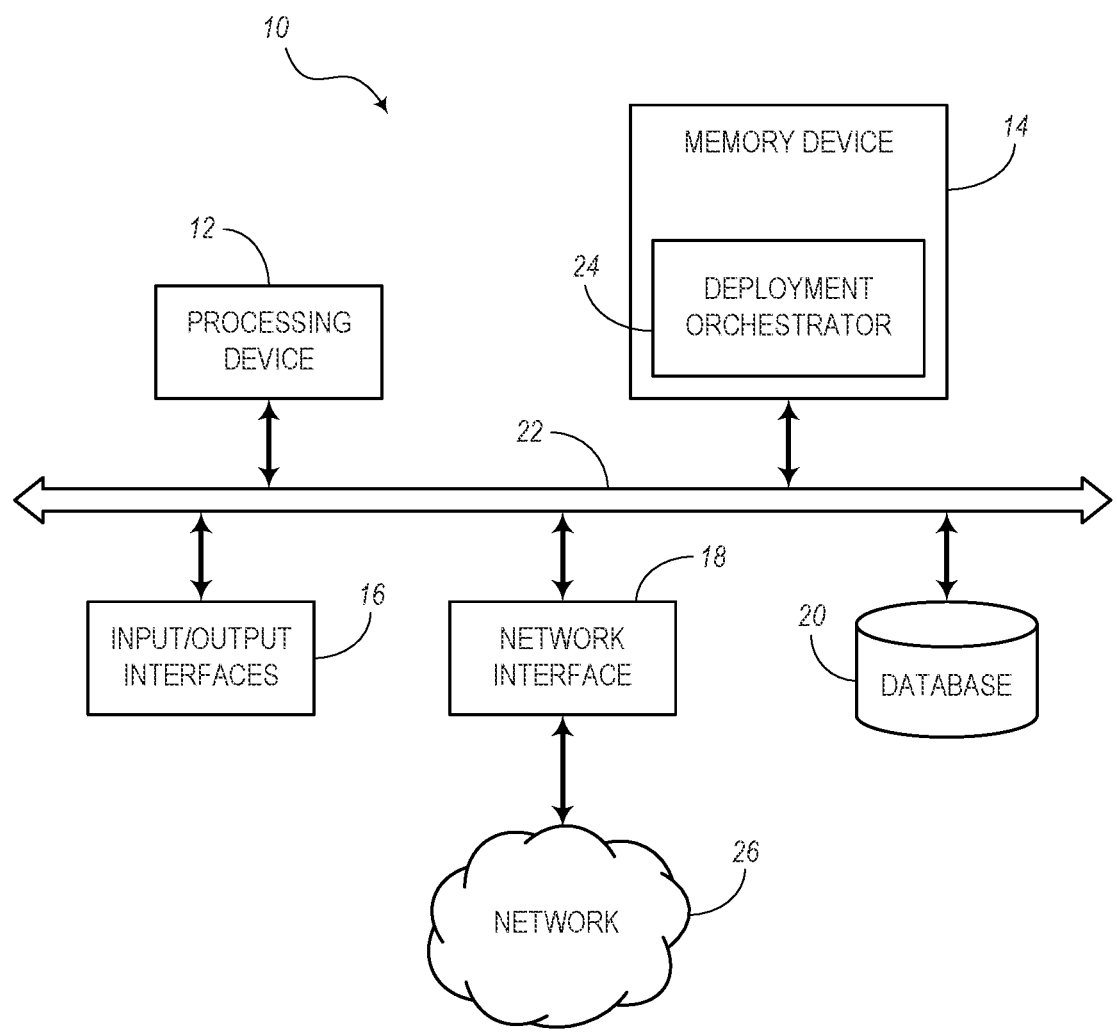
FIG. 1 is a block diagram illustrating a computing system for enabling a developer to build and deploy a product, according to various embodiments of the present disclosure.

FIG. 1 is a block diagram illustrating an embodiment of a computing system 10 for enabling a developer to easily build and deploy a product within a network. In the illustrated embodiment, the computing system 10 may be a digital computing device that generally includes a processing device 12, a memory device 14, Input/Output (I/O) interfaces 16, a network interface 18, and a database 20. It should be appreciated that FIG. 1 depicts the computing system 10 in a simplified manner, where some embodiments may include additional components and suitably configured processing logic to support known or conventional operating features. The components (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

It should be appreciated that the processing device 12, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 12 may also include or utilize stored program instructions (e.g., stored in hardware, software, and/or firmware) for control of the computing system 10 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 14 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 14 may incorporate electronic, magnetic, optical, and/or other types of storage media. The memory device 14 may have a distributed architecture, where various components are situated remotely from one another, but can be accessed by the processing device 12.

The memory device 14 may include a data store, database (e.g., database 20), or the like, for storing data. In one example, the data store may be located internal to the computing system 10 and may include, for example, an internal hard drive connected to the local interface 22 in the computing system 10. Additionally, in another embodiment, the data store may be located external to the computing system 10 and may include, for example, an external hard drive connected to the Input/Output (I/O) interfaces 16 (e.g., SCSI or USB connection). In a further embodiment, the data store may be connected to the computing system 10 through a network and may include, for example, a network attached file server.

Software stored in the memory device 14 may include one or more programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 12), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 12 or other suitable circuitry or logic). For example, when executed, the instructions may cause or enable the processing device 12 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., the processing device 12), or any suitable combination thereof. Software/firmware modules may reside in the memory device 14, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 16 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The computing system 10 may further include a deployment orchestrator 24. The deployment orchestrator 24 may be configured to enable the developer to manage an entire process for building, packaging, configuring, deploying, and managing the lifecycle of a product and/or configuration that is to be deployed in a communications network. The product may be configured for performing any type of services or microservices. The deployment orchestrator 24 may implemented, at least partially, as software, firmware, and/or middleware and stored in the memory device 14. Also, the deployment orchestrator 24 may additionally or alternatively be implemented, at least partially, as hardware in the processing device 12. In some embodiments, the deployment orchestrator 24 may be implemented in any suitable combination of hardware, software, firmware, and/or middleware. Furthermore, the deployment orchestrator 24 may include multiple levels for controlling different operational levels. These levels may be implemented in one device (e.g., computing system 10) or in multiple devices throughout a network. For simplicity, the present disclosure includes the embodiment where the deployment orchestrator 24 is implemented on one device. However, it should be noted that embodiments where the deployment orchestrator 24 is implemented on multiple devices are also conceived and should be understood as being part of the present disclosure.

The network interface 18 may be used to enable the computing system 10 to communicate over a network 26, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network 26.

The computing system 10 and/or deployment orchestrator 24 may be configured as a configuration-based deployment system, which may be configured to provide a method to unify the build, testing, packaging, package-deployment, and service life-cycle activities necessary in software development and deployment. The unified configuration system allows for the application of declarative configuration principles to software development and deployment, which removes duplication and dramatically reduces developer effort to build and maintain such systems. For example, the management of declarative configurations may be defined as a tool that allows a user to declare a desired state (of the product to be deployed) and then allow the deployment orchestrator 24 to compare that desired state to a present state and then automatically update the configuration information for the product to obtain the declared state. In some embodiments, the deployment orchestrator 24 may coordinate existing tools, such as Puppet, Chef, Terraform, Kubernetes, etc.

According to the present embodiments, build systems and runtime systems are configured to use the same source of highly configurable data to determine dependencies, generate and deploy packages, and react to configuration changes both on the build side and the runtime side. This data may be schema-based config data, rather than hand-crafted scripting, which allows the data to be shared, consumed, and transformed to multiple layers in the deployment. For example, in computer programming, a runtime system may implement an execution model to provide a more convenient environment for running programs during production (e.g., building, testing, etc.). Most programming languages may have some type of runtime system that provides an environment in which programs run.

The deployment orchestrator 24 may include a "toolchain" for performing various tasks within the overall deployment process. Any elements in the toolchain (e.g., build, runtime, etc.) can consume and/or modify the deployment data and customize and refine packaged elements. Thus, configuration data that changes at runtime in a deployment can affect the deployment itself and can drive subsequent changes to other services deployment data, for creation or deletion of other services, to trigger a packaging system to fetch and deploy additional services, and/or to trigger a build system to build and deploy additional services.

In the field of software, a toolchain may be considered to be a set of programming tools used to perform complex development tasks or to create a software product. This may include one or more other or related computer programs. The tools of a toolchain may be executed sequentially whereby the output of one tool becomes the input to the next tool. A software development toolchain may include a compiler and a linker (i.e., which transforms source code into an executable program), libraries (i.e., which provide interfaces to the operating system, provide common functionality and APIs to multiple process), drivers can provide interface to operating systems and hardware, and a debugger (i.e., which is used to test and debug programs).

One aspect of the present disclosure is the ability for elements in a deployment to be described in data and for all other elements in the deployment to be able to query and modify the deployment configuration. This can apply to runtime elements, packaging elements, testing elements, build system elements, library systems, version control elements, etc. Layer models allow the upper layer elements to override configuration data defined by the lower layer. For example, version control may refer to revisions or source code management or configuration management with respect to software development and include the management of changes to computer programs, documents, web sites, etc.

The deployment in schema-based configuration data may include: a) subnetworks in a network, b) processors in a subnetwork, c) core affinity on processors, d) containers (e.g., VM, container, namespaces, hypervisors, etc.) in processors, e) domains (e.g., processes) in containers, f) services and plug-ins in domains, g) models in APIs, h) dependencies between elements (e.g., models, plug-ins, libraries, services, etc.), i) locations of source code, j) build instructions for services, k) service level deployment data, l) domain level deployment data, and/or m) container level deployment data, Inside the platform build engines, deployment data may be consumed. For example, this may start with an empty configuration (config). Addition of services can trigger new configuration for other services, which may be done recursively (e.g., new services, new or modified deployment data, etc.). If required services need to be built, the build engine may be configured to build scripts and configuration files generated for the build. Then, the build engine can proceed with building for each service. Also, artifacts (e.g., by-products created during software development, use cases, models, product requirements, design specifications, etc.) for each service can be generated and packaged. If the target product is not the same as the build product, the build engine may generate a cross-complied, cross-platform release if needed. Also, a portion of the deployment orchestrator 24 on the build side can launch the required simulators or containers.

On the target products, deployment data may be consumed. The build engine may include starting with an empty config. The addition of services can trigger new configurations for other services, which may be done recursively (e.g., new services, new or modified deployment data, etc.). Typically, services will not need to be built since platform build and delivery to target may have occurred at this point. The build engine may launch each required domain via platform Life Cycle Management (LCM). A domain launcher may be configured to launch required services inside the domain. Also, the deployment LCM may be configured to manage startup of local deployment.

Once the network is running, a deployment can be modified on a target product or on a build system. The build system can change to a build deployment configuration and its state can be detected. This can include source revision changes, source code changes, dependency changes, and/or deployment data changes. Changes can trigger a rebuild of required services, re-computation of deployment data, or other actions. Also, redeployment of services or data to targets may be done if needed. A target product may be configured to detect changes pushed by the build system and may re-deploy or restart services or domains as needed.

In some embodiments, changes to a running deployment configuration and state may be detected. These may include deployment, domain, service level deployment configuration changes, etc. Most changes would not trigger build system changes. This may include re-computation of deployment configuration, re-deploy or restart services or domains as needed.

Furthermore, if changes result in changes to a build system deployment, the build system deployment orchestrator (e.g., deployment orchestrator 24) would be triggered to rebuild or redeploy as needed. A deployment orchestrator may include a number of devices that consume this deployment data at every level. These orchestration devices on each level may be referred to as plug-in modules. There may be a hierarchy of plug-in modules that spans multiple levels of the entire deployment orchestrator. The levels may include a build system layer, a packaging layer, a runtime layer, and other layers.

The deployment data is described in a schema, and the hierarchy of plug-in modules is itself described as part of a deployment. The plug-in modules running at every level operate as independent services. However, the plug-in modules may be configured to provide messages between each of the respective layers. Also, the plug-in modules may operate on the principle of declarative configuration, where a desired state is entered and each plug-in module is configured to work to provide that state. A deployment configuration can be pushed, validated, and accepted without the operator or the user needing to understand how the deployment will be constructed. The deployment orchestrator 24 will know the requested configuration and use whatever tools are needed at the appropriate layer to meet that config or to alarm and notify failures in the deployment.

According to various embodiments, the deployment orchestrator 24 may be configured to enable the processing device 12 to automate the generation of the software code that is needed for build systems and deployments to various products. In this respect, some key features may include a configuration driven process via a schema-based model. This may include recursively extensible controllers at each of the plug-in modules, where the controllers act on the configuration information. It should be understood that the plug-in based controllers may be configured to work with existing toolchains to apply the requested configuration. The deployment orchestrator 24 may also include multiple plug-in modules that can communicate across the various layers to enable orchestration at any areas of deployment management.

Figure 2:
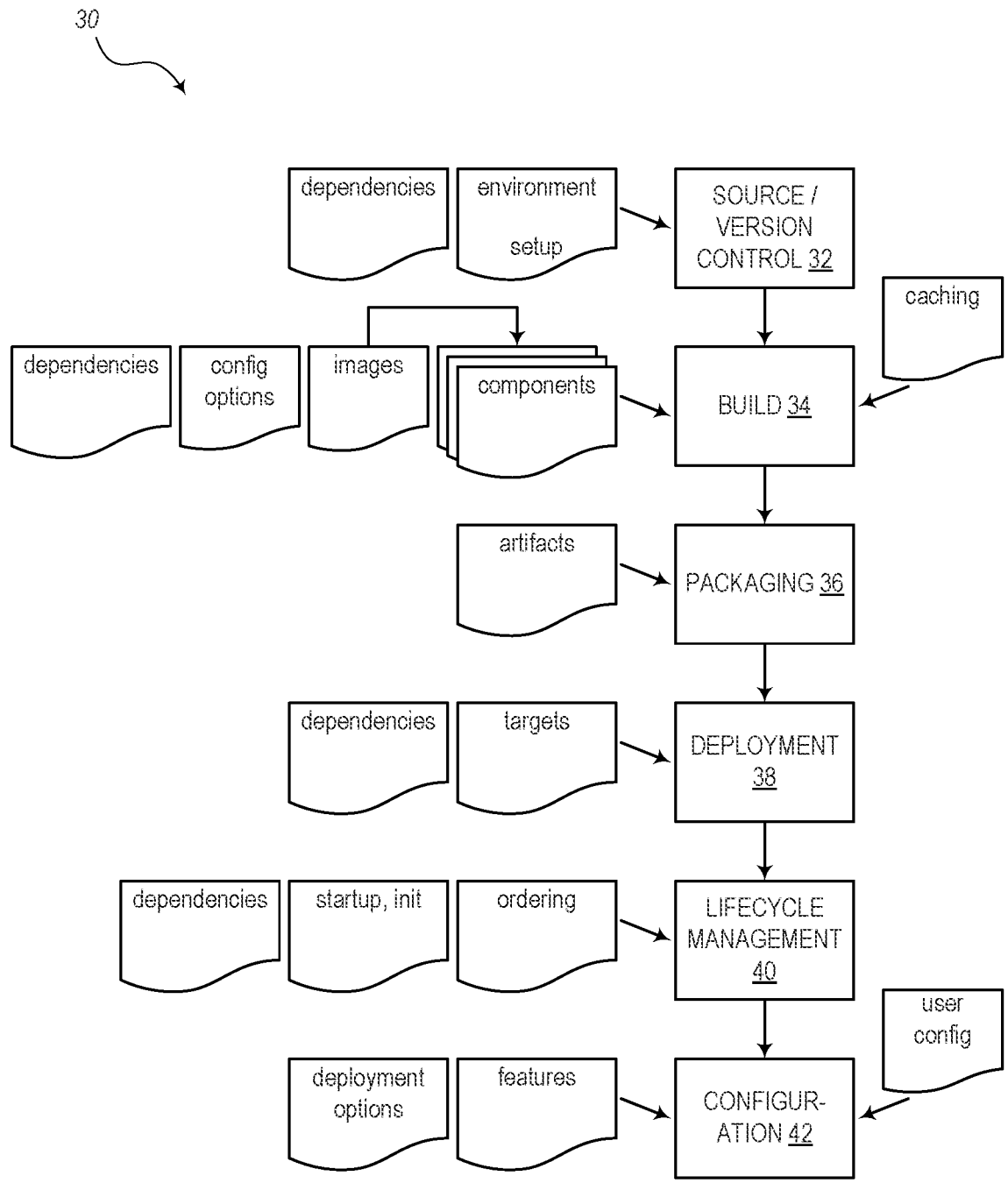
FIG. 2 is a diagram illustrating a conventional multi-level deployment system including a combination of hardware and software for executing certain deployment processes, according to various embodiments.

FIG. 2 is a diagram illustrating an embodiment of a conventional multi-level deployment system 30, which may include any suitable combination of hardware and software for executing certain deployment processes as described in the present disclosure. In this embodiment, the multi-level deployment system 30 may include a sequence (top to bottom) having a source/version control module 32, a build module 34, a packaging module 36, a deployment module 38, a Life Cycle Management (LCM) module 40, and a configuration module 42. The multi-level deployment system 30 of FIG. 2 shows the existing implementation with all the inputs that need to be crafted manually and independently For example, in this embodiment, the multi-level deployment system 30 may include a solution that may rely on handcrafted scripts and middleware (e.g., software glue) to implement a configuration for a product. The middleware may be specific to the technology used for each layer. At each layer, similar information (e.g., configuration options, dependencies, and versioning) may be repeated in layer specific configuration files. Each layer may receive information or files with respect to dependency, environment, setup, configuration options, images, components, artifacts, targets, startups, initializations, ordering, deployment options, and/or features, as shown in FIG. 2. Also, the build module 34 may be configured to receive caching information and the configuration module 42 may be configured to receive user config information.

Figure 3:
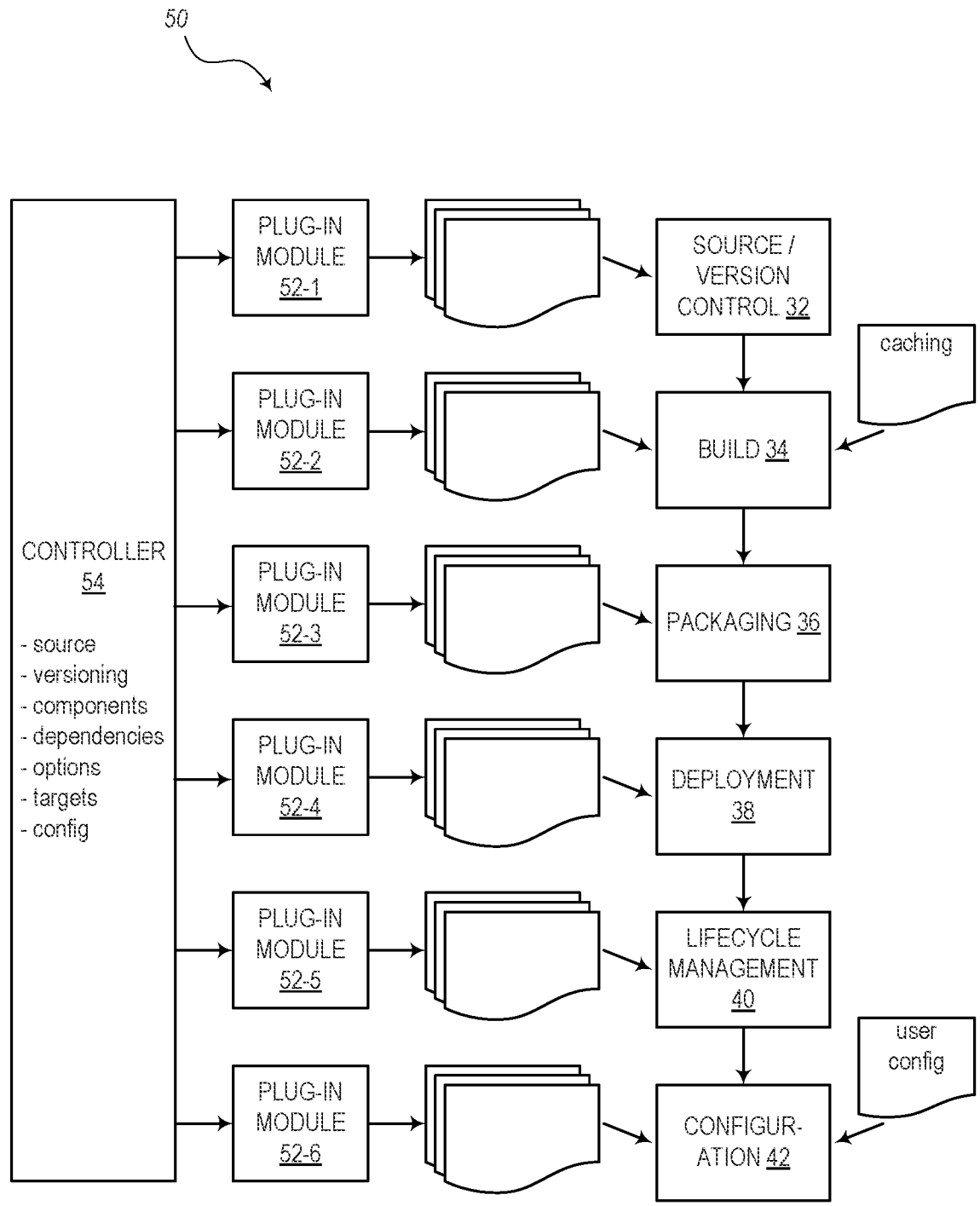
FIG. 3 is a diagram illustrating a multi-level deployment system having hardware and software for executing deployment processes, according to various embodiments.

FIG. 3 is a diagram illustrating a embodiment of a multi-level deployment system 50, which may include any suitable combination of hardware and/or software for executing deployment processes. The multi-level deployment system 50 in this embodiment includes the sequence (from top to bottom) as described with respect to FIG. 2 having the source/version control module 32, the build module 34, the packaging module 36, the deployment module 38, the LCM module 40, and the configuration module 42. In addition, the multi-level deployment system 50 of FIG. 3 includes a plug-in module 52-1, 52-2, . . . , 52-6 at the six different levels. The plug-in modules 52 may be configured to supply the information or files for each respective level. Also, a controller 54 may be configured to control each of the plug-in modules 52 at each level with respect to a number of criteria. For example, the controller 54 may control source information, versioning information, component information, dependency information, option information, target product information, config information, etc.

The generation of layer specific middleware from a common model may be needed for the deployment orchestrator or multi-level deployment system 50 to function. The controller 54 also coordinates between layers automatically as needed. As a result of the operations of the controller 54, it is possible to remove the manual processes of environment setup, build trigger, and deployment to targets and instead provide automated processes for coordinating these steps. This coordination also allows layers to interact in "non-linear" flows, where a configuration option change on the target can affect the higher level deployment configuration options at all layers and they can react to state changes and configuration changes in the various layers.

Also, it may be noted that this coordination process may be configured to change the direction of flow from the top-to-bottom configuration to be a bi-directional configuration. The multi-level deployment system 50 in this embodiment is also configured to allow different layers of orchestrators (e.g., plug-in modules 52) to communicate about the configuration and state of the deployment. As the configuration changes, the running deployment may deviate from the intended configuration. It is the job of the controller 54 and plug-in modules 52 at every level to "enact" the deployment configuration by reacting to configuration changes and communicating with other layers to control each layer as needed.

Figure 4:
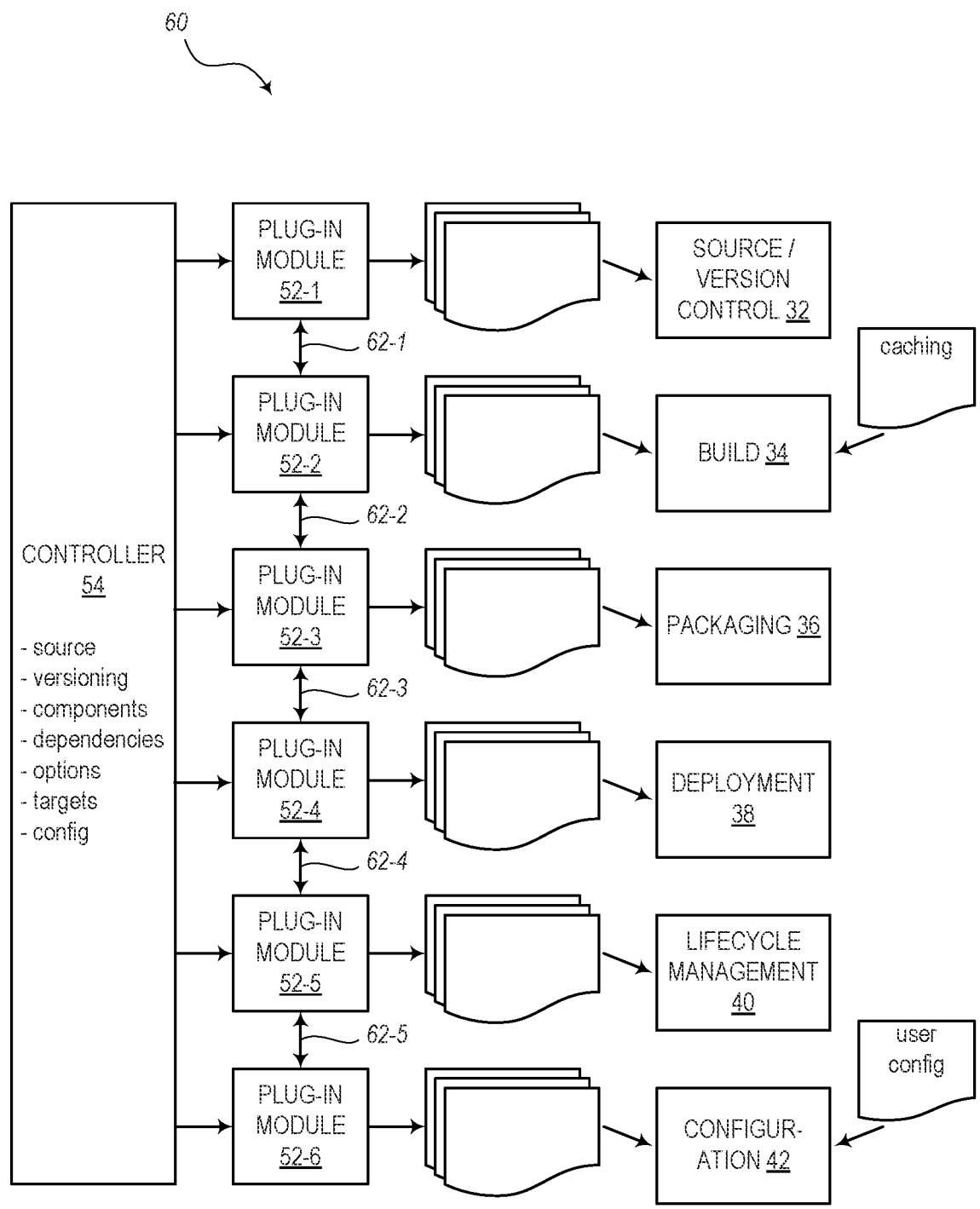
FIG. 4 is a diagram illustrating another multi-level deployment system, according to various embodiments.

FIG. 4 is a diagram illustrating another embodiment of a multi-level deployment system 60 including the modules 32, 34, 36, 38, 40, 42 also shown in FIGS. 2 and 3, and including the plug-in modules 56-1, 56-2, . . . , 56-6 and controller 54 also shown in FIG. 3. In addition, the multi-level deployment system 60 includes direct control links 62-1, 62-2, 62-3, 62-4, and 62-5 between the adjacent pairs of plug-in modules 56. The direct control links 62 enable one plug-in-module 56 to control either or both of the adjacent plug-in modules 56 for bi-directional control.

To illustrate a use case for the multi-level deployment system 60, consider that there is a service designed to monitor a system. Suppose it is built as a generic microservice that has a common element, a driver layer for monitoring CPU usage for specific operating systems, and an optional package that supports monitoring of file systems. Also, suppose that software code is intended to be deployed onto two different products (described with respect to FIG. 5), which have different build engines, operating systems, and LCMs.

Figures 5, 6:
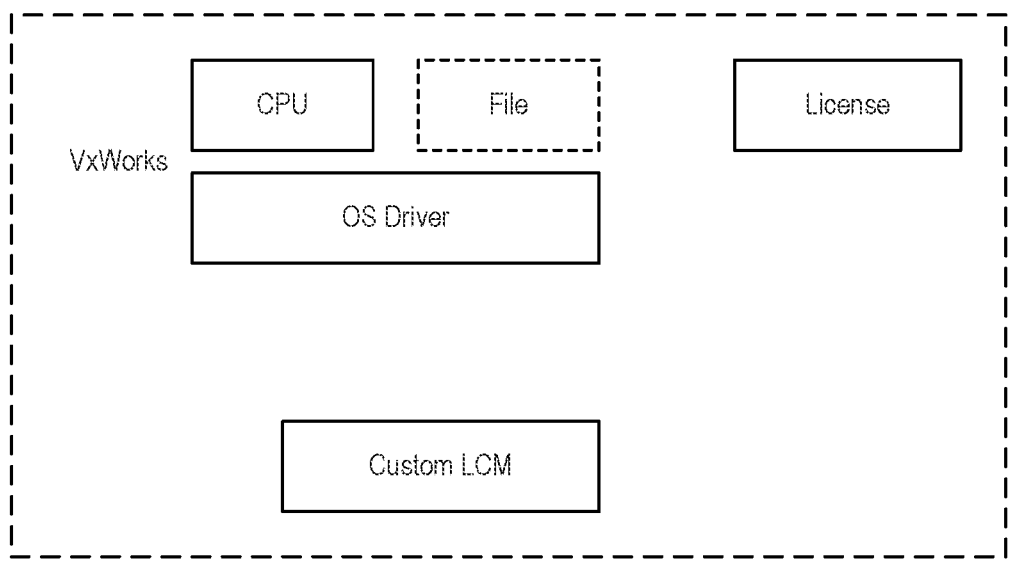
FIG. 5 is a table illustrating various deployment characteristics of two products to be deployed, according to various embodiments.
FIG. 6 is a block diagram illustrating a target representing a first product, according to various embodiments.

FIG. 5 shows a table 70 of various deployment characteristics of two products. Product #1 has a build system including an in-house system, a version control system including a Repo tool, an operating system including VxWorks, an LCM system including Custom startup code, an NBI system including REST and NETCONF, and a Target including SIM/HW. Product #2 has a build system including Yocto (Open Source), a version control system including Multiple tools (Repo, lineup, hard coded commit), an operating system including Linux, an LCM system including Systemd (Open Source), an NBI system including NETCONF, and a Target including SIM/HW.

Solution without Plug-In Modules

The following steps are needed to manually include the basic service (CPU monitoring) into existing deployments on Product #1 and Product #2. The service itself may be stored in a git repository.

Product #1 has a structure defined in component level bundle files and a top-level bundle to include the components into different targets. These bundle files describe the source files, the artifacts, and include LCM directives for initialization and ordering. The versioning system is managed through the "repo" tool and needs repo manifests to be created to link the components to the git repositories. This deployment runs in VxWorks and is a statically linked monolith (single process in shared memory space).

FIG. 6 is a block diagram illustrating an example of a Target representing Product #1 described with respect to FIG. 5. In some embodiments, steps to include the generic service into Product #1 for deployment may include handcrafting bundle files for "system monitor" service. Handcrafting the bundle files may include a) product image updating, which may include adding recipes to the hardware image and the sim image. Handcrafting may also include b) code bundling, which may include a repo manifest process (e.g., with source URL and version information), where dependency is hardcoded in a bundle file, and where dependencies are connected to framework elements (e.g., messaging and database info). The code bundle may also include hooks to proprietary LCM (e.g., INIT_BEFORE, INIT_AFTER, IN IT_FUNCTIONS).

The handcrafted bundle files may also include c) a YANG recipe (e.g., repo manifest, such as source URL, version, branch information, etc.) and a target for YANG compilation. Also, the handcrafted bundle files may include d) a CPU driver recipe for VxWorks, which may include a repo manifest (e.g., source URL, version, branch). The handcrafted bundle files may also include e) source repo config. The source repo config may include 1) custom code needed for LCM/startup in a VxWorks monolith (e.g., number of defines/patches in the code), 2) custom Makefile and configuration, 3) init code for initialization callbacks, 4) "checkpoint" code for proprietary LCM, and/or 5) configuration options hardcoded in special files to drive behavior.

Product #2, on the other hand, may have a structure defined using the Yocto build system with BitBake recipes for each component. There is a set of image targets that indicate which recipes to include in each image. Each recipe indicates what other recipes it is dependent on. These components may be built as libraries and need to be linked together into a process. The process may be managed by Systemd as a life-cycle manager, which may use handcrafted service files to indicate how to launch and to indicate the other services that the component depends on. The versioning and source locations are managed through the BitBake recipes.

Figure 7:
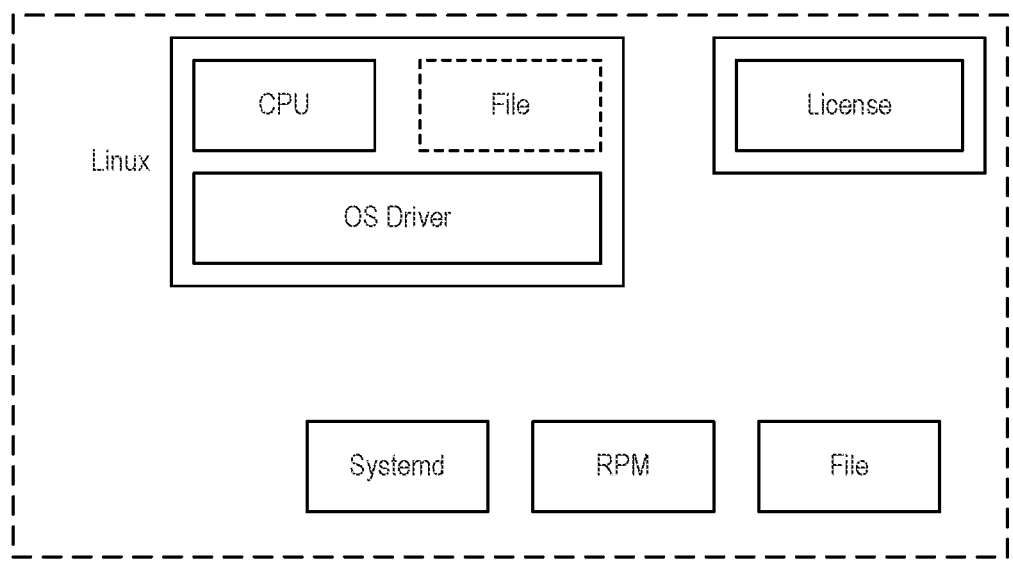
FIG. 7 is a block diagram illustrating a target representing a second product, according to various embodiments.

FIG. 7 is a block diagram illustrating an example of a Target representing Product #2 described with respect to FIG. 5. According to some embodiments, steps to include the generic service into Product #2 for deployment may include generating a recipe for CPU service, which may include a) product image updating (e.g., adding recipes to the hardware image and the sim image), b) a code recipe, which may include 1) source URL, 2) version info, 3) dependency to driver library, 4) dependencies to framework elements (e.g., messaging, database, etc.). Generating the recipe for CPU service may further include c) a YANG recipe (e.g., source URL, version, branch, dependencies on YANG generation recipe, etc.), d) driver recipe for Linux (e.g., talks to top/ps), such as source URL, version, and branch. Generating the recipe for CPU service may also include e) files needed for a system (e.g., service file for startup to launch, dependencies to other Systemd targets, etc.), f) source repo configuration. Source repo config may include 1) configure.ac, such as i) build time package dependencies (which libraries are linked to the executable), and ii) runtime configuration options via Makefile #defines, environment variables and/or configuration file. The source repo config may also include 2) main( ) generation (e.g., initialize libraries, wait for services to be ready, etc.) and 3) configuration (e.g., where to get configuration files in a file system).

Solution with Plug-In Modules

With the deployment orchestrator 24, work is needed up front to make sure each product includes the plug-in modules 52 for build and runtime integration. For Product #1, the plug-in modules 52 exist for VxWorks, repo and build engine drivers to make the artifacts needed for services. For Product #2, plug-in modules 52 exist for Yocto, BitBake, Linux, Systemd, and service drivers.

Each product has product-specific deployment data associated with it, including, for example, messaging protocols supported, LCM solution, file paths for config data, and testing integration hooks. In order to support these services on the required products, the following configuration must be applied to the plug-in modules 52.

Note that this config can be provided via CLI, input files, REST API, NETCONF API, gRPC, messaging port strategies, and licensing. This config is declared and can be amended to the products deployment data to determine what new elements are needed from build layers, deployment layers, and runtime layers. Deployment config may include service names, dependencies (e.g., runtime, build, plug-ins, and messaging), and configuration (e.g., behavioral drivers, messaging ports, etc.).

Once this data has been pushed to each product's deployment, the orchestration engines and plug-ins may be configured to 1) detect differences between the new config and the present state, 2) determine the changes that need to be applied to get from the current state to the new configuration, and 3) invoke handlers and controllers for a) build layer, b) caching layer, c) deployment layer, d) configuration layer, e) LCM, and f) runtime. The controllers (e.g., plug-in modules 52, controller 54) may be configured to generate the files and commands needed by each element and orchestrate themselves to proceed through the build, deploy, test stages as needed. If desired, the deployment orchestrator 24 can also generate the artifacts and the commands needed for offline processing of the changes needed to get the desired service build, integrated, deployed, and running.

Using the deployment orchestrator 24, a developer may configure Product #1 such that it can consume this new config. Then the deployment orchestrator 24 may perform the following actions as needed for Product #1 deployment:

1) consume deployment file,
2) amend deployment based on product requirements, and
3) generate bundle files for CPU service.

The third step of generating bundle files for CPU service may include 1) updating product image (e.g., amending recipes to the hardware image and the SIM image, which either requires hooks to extend lineups or depo needs to be run before the build engine), 2) providing code bundles, such as repo manifests extended (e.g., source URL, version), dependencies generated in bundle file from depo data, and hooks to proprietary LCM generated from deployment dependencies. Generating bundle files may also include 3) generating YANG recipe, such as repo manifest (e.g., source URL, version, branch, etc.), and target for YANG compilation, 4) providing driver recipe for VxWorks, such as repo manifest (e.g., source URL, version, branch), and 5) providing source repo config, which may include a) generating custom code needed for LCM/startup in VxWorks monolith, b) generating custom Makefile and configuration, c) generating entry code for initialization callbacks, d) generating "checkpoint" code for proprietary LCM, and/or e) generating code or config files for hardcoded options.

Similarly, Product #2 may consume the same deployment data. Note that code and config modifications may not be necessary if the product deployment services are advanced well enough to be data driven and not needed to modify source to generate the proper runtime artifacts. For example, a launcher can be used on the target to dynamically load and orchestrate the init/launch and runtime of services based on downloaded deployment configuration data. Product #2 may use its product level deployment and orchestration services to do the following for deployment to generate recipes for CPU service: 1) amend product image, such as automatically add recipes to the hardware image and the sim image, 2) create code recipe, such as source URL, version, generate dependency to driver library, dependencies to framework elements can be handled in runtime launcher for the product (e.g., messaging, database, etc.), and 3) create YANG recipe, such as source URL, version, branch, and generate dependencies on yang generation recipe. Also, generating recipes for CPU service further includes 4) driver recipe for Linux (e.g., talk to top/ps), such as source URL, version, and branch, 5) generate files needed for Systemd based on deployment config, such as service file for startup to launch and dependencies to other Systemd targets.

Generating recipes for CPU service for Product #2 can further include 6) source repo config (if needed), which may include a) configure.ac patches if needed (e.g., build time package dependencies (which libraries are linked to the executable), runtime configuration options via Makefile #defines, environment variables, and/or configuration file), b) main( ) generation (e.g., initialize libraries, wait for services to be ready, etc.), and c) configuration (e.g., where to get configuration files in a file system). Also, generating recipes can further include 7) deployment data deployed to runtime system (e.g., replace Systemd as a lifecycle manager (LCM), use depo data to launch and initialize services on the target platform, etc.).

This example shows the benefit of the plug-in modules 52-1, 52-2, . . . , 52-6 (or fewer or more plug-in modules according to other embodiments). The plug-in modules 52 may be configured for operation at any or all levels. According to the embodiment of FIG. 3, operation generally proceeds in one direction. Adding a new service will cause build engines to build, integrate, and deploy that service in different products.

Another example involves runtime reconfiguration. For example, assuming that a system monitor has been deployed in its default configuration of a CPU on a given product. Also, assume that a user (e.g., end user, developer, etc.) enables a license in another service that enables file system information to be monitored using the service. However, suppose that this requires installation of an additional package.

To enable file-monitor via licensing change, the deployment orchestrator 24 may be configured to perform the following processes. The system-monitor may detect the change and extend the definition of its process to include a file system monitoring service. A local plug-in module may detect this change and attempt to deploy the new configuration. If the package is not present locally and deployment integration is enabled, a higher level plug-in module 52 running off the device can detect there is a requested service that needs to be deployed to a target. If the package is not present in the build cache, the build level plug-in module 52 will amend the product level deployment config to include this service.

Once the build is complete, it is cached and downloaded to all targets that need it. Once the library is present on the targets, the local plug-in modules can detect which services need to dynamically load and initialize the additional library. Lifecycle management hooks inform other dependent services of the changes to the deployment and they can react. New filesystem monitoring is delivered via one configuration change. It should be noted that there may be many other examples which can be used to illustrate the use of common deployment data at all levels of integration.

Example: Network Operator Deployment Orchestration

According to some embodiments, the plug-in modules 52 may also have applications for network operators. The plug-in modules 52 may be designed to have pluggable components (e.g., hardware, software, and/or middleware components) that can add features such as licensing. Using these plug-in modules 52, the deployment orchestrator 24 (or one of the deployment systems 30, 50, 60) can be extended to include a customer-visible endpoint.

Figure 8:
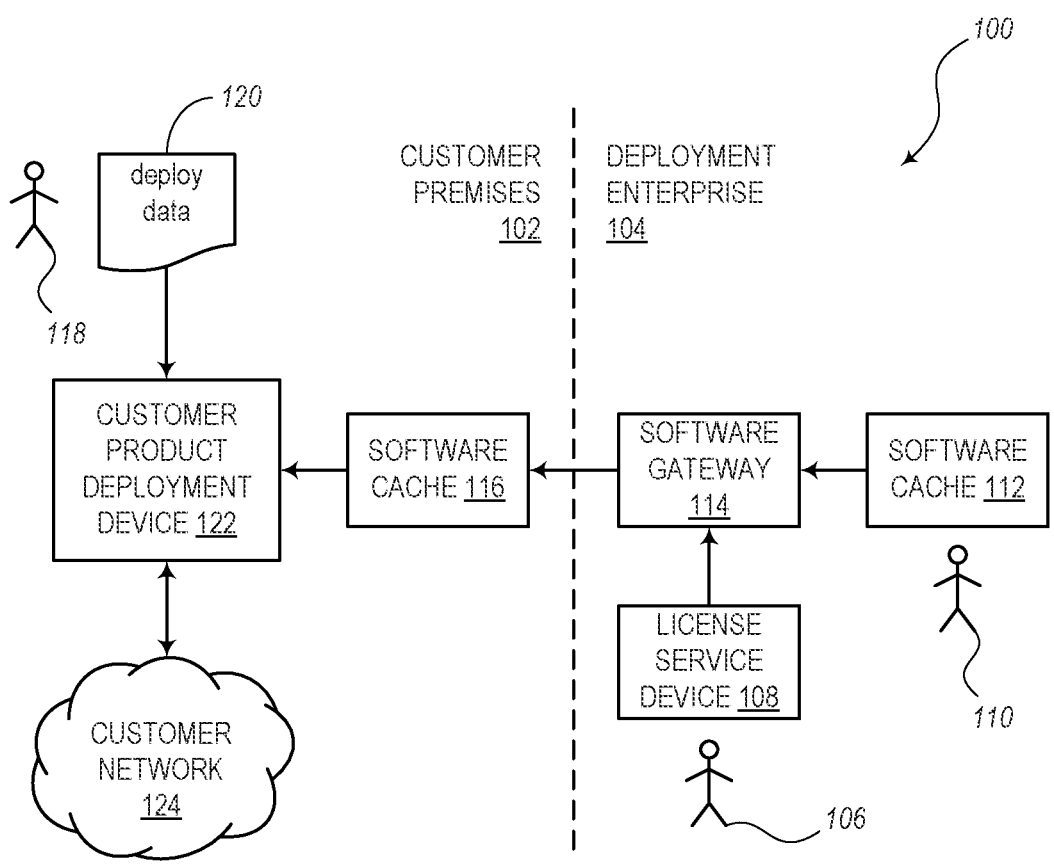
FIG. 8 is a diagram illustrating an example of a deployment system for providing deployment services from a deployment enterprise to a customer premises, according to various embodiments.

FIG. 8 is a diagram illustrating an example of a deployment system 100 for providing deployment services from a deployment enterprise 102 to a customer premises 104. In the deployment enterprise 102, a sales and marketing user 106 (or team) is configured to enter licensing input to a license service device 108. A product development user 110 (or team) is configured to enter software development input to a software cache device 112. The licensing service device 108 and software cache device 112 are configured to pass relevant information to a software gateway device 114. In some embodiments, the deployment orchestrator 24 (or one of the deployment systems 30, 50, 60) may be incorporated in the software gateway device 114 of the deployment enterprise 102 for managing the deployment activities with respect to certain equipment or products running at the customer premises 104. The customer product deployment device 122 may be configured to run and/or control devices on a customer network 124.

The deployment system 100 of FIG. 8 further includes a software cache device 116 at the customer premises 104 that is configured to communicate with the software gateway device 114 of the deployment enterprise 102. A user 118 (e.g., customer) may be configured to enter deployment config data 120 to a customer product deployment device 122. Also, the customer product deployment device 122 is configured to receive deployment strategies from the software cache 116. Furthermore, the customer product deployment device 122 may include portions of the deployment orchestrator 24 and/or deployment systems 30, 50, 60 for performing the various deployment steps as needed according to the various embodiments described in the present disclosure.

In one example, a network operator can add gRPC capabilities to the Network Elements (NEs) operating at the customer premises 104. The deployment system 100 may include the following steps:

1. The network operator (e.g., user 118, end user, customer, etc.) may purchase gRPC capabilities for deployment at the customer premises. Deployment client information may be provided to the customer product deployment system 122, possibly as an installable tool or perhaps as part of a network management system.

2. The customer can update the deployment configuration to include gRPC provisioning.

3. The customer product deployment system 122 is configured to detect the change in deployment and checks if a gRPC server has been installed on the NEs in the customer network 124. If the NEs have a gRPC server, then they can be enabled, and network configuration process is finished.

4. If the NEs do not have a gRPC server installed, then the customer product deployment system 122 checks for the software in a customer-premises software cache 116. If found, then the server can be installed on the NEs (e.g., in the customer network 124) and enabled.

5. If the customer-premises software cache 116 does not contain a gRPC server, then the customer product deployment device 122 may be configured to contact the software gateway 114 of the deployment enterprise 102, such as by using the customer's credentials.

6. The software gateway 114 can check the licenses allocated to the customer, ensuring that gRPC support has been purchased by this customer. If no license for this customer is found, the software gateway 114 can be forwarded to sales and marketing user 106 (or team) through the license source device 108.

7. If a license is found, then the required software is delivered to the customer and installed on the NE and enabled. A customized software package is built and sanitized and delivered to the customer, and the whole process is automated.

The following description compares conventional tools with the deployment systems (e.g., deployment orchestrator 24, deployment system 30, 50, 60, 100) describe in the present disclosure. For example, BitBake is a build and packaging tool created by the OpenEmbedded project that is designed to automate software builds that combine one or more packages as a kind of meta-make. The package compile process is automated by referencing files that contain metadata that defines how to build the package. Metadata files (called recipes) have to be handcrafted by developers, similar to how Makefiles must be written for the make tool. The primary target application for BitBake is the construction of embedded systems.

Yocto (Poky) is a build and packaging tool created the Linux Foundation to use the OpenEmbedded build system (including BitBake) to make embedded Linux images. The product of the Yocto project is a set of build recipes that make an image file containing a Linux kernel and user-space packages, which are suitable to be flashed onto an embedded device. The set of recipes forms a reference Linux distribution, called Poky. Creation of new deployment requires hand-crafting scripts and Yocto specific non-transformable (non-schema based) data.

Ansible is a provisioning and configuration management tool that is designed for managing large numbers of computers (either hardware or cloud images). Ansible uses a declarative configuration model where the user specifies the configurations of systems. The Ansible tool compares the current running states of the systems and takes automatic action to converge the running systems with the desired configuration. The high-level tool relies on sets of modules that are used to define procedures for how Ansible can check the status of the configuration and state of a system as well as make changes to the running state, including editing (replacing) configuration files, starting/stopping/restarting services, starting cloud instances, etc. Extending the capabilities of Ansible requires providing new modules by writing code that forms a kind of plug-in.

Kubernetes is a cloud orchestration tool that can manage large numbers of services, including service bring-up, scaling, health monitoring, and other actions. Kubernetes provides a declarative configuration format that specifies the organization of the services into groups and the resources (CPU, disk-space, connectivity/routing) that those services require. Kubernetes requires services to be packaged into containers and was originally built as a high-level tool to manage Docker instances.

Systemd is an orchestration system that includes a replacement init process and related collection of tools to automate Linux OS boot and OS service management. Tools included in Systemd include init, logging, datetime management, service socket management, container management (limited to one host system, not suitable for cloud deployments), and many other tools.

The Deployment Orchestrator (e.g., deployment orchestrator 24, deployment systems 30, 50, 60) as described in the present disclosure is a build, packaging, provisioning, configuration management, and orchestration tool that may be considered as a next-generation tool that includes some of the advantageous parts of the above tools and provides an integrated way of building and managing software, particularly microservices. Also, the Deployment Orchestrator of the present disclosure is configured to overcome many of the issues that exist as a result of utilizing disconnected tool, which may require a user to repeat many similar tasks for each product that is deployed. Instead, the Deployment Orchestrator can reuse software from one product to another.

Deploying microservices would normally require a lot of manual effort on the part of a developer in order to configure most/all of the above conventional tools. For example, each of the conventional tools includes its own configuration tools/formats and are generally unaware of each other. However, the Deployment Orchestrator is configured to provide a uniform configuration format that allows each step of the software lifecycle (e.g., development, testing, deployment to customer, runtime management, monitoring, etc.) to operate from the same set of data, which dramatically reduces the amount of effort required to maintain a traditional "DevOps pipeline." New deployments can be crafted in data and this data (e.g., source, dependencies, targets, runtime configuration options, etc.) can be used at every layer (e.g., at each plug-in module 52) and stage of the pipeline.

Figure 9:
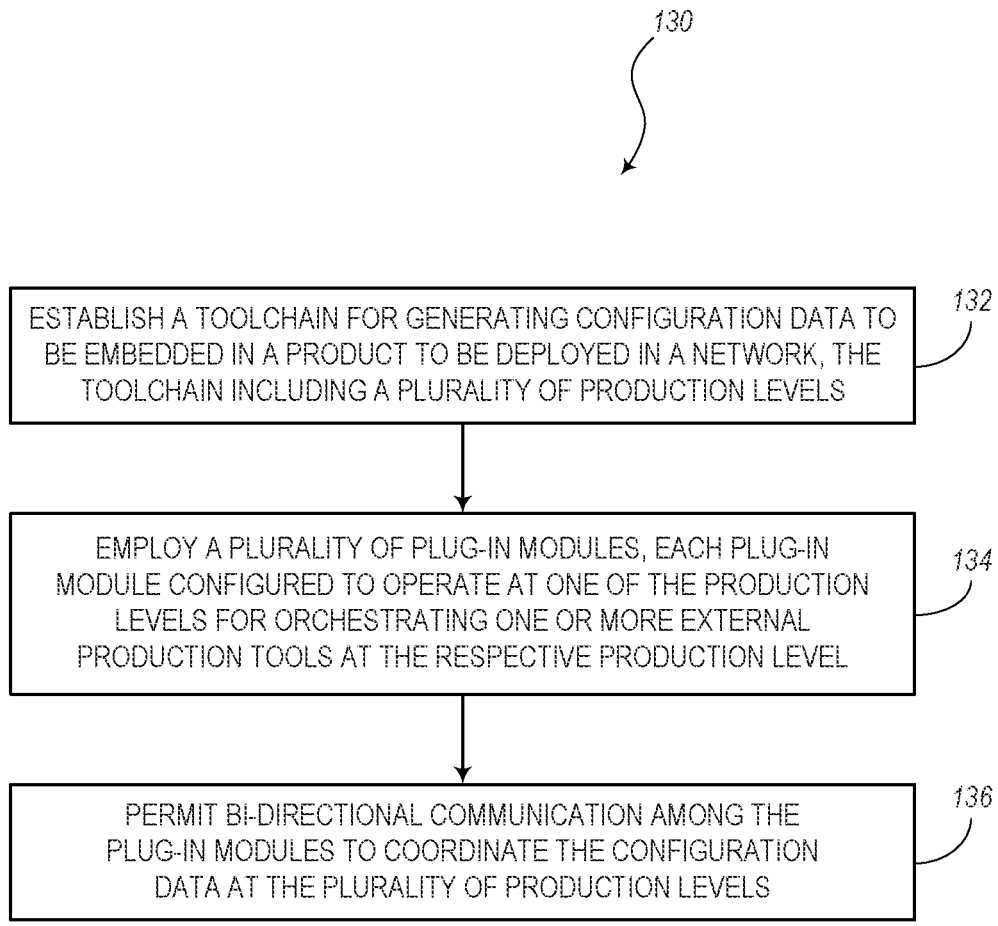
FIG. 9 is a flow diagram illustrating a process associated with the deployment of a product within a network, according to various embodiments.

FIG. 9 is a flow diagram illustrating a process 130 associated with the deployment of a product within a network where software code is embedded in the product according to specific configuration data for preparing the product for use in a desired capacity. In this embodiment, the process 130 includes a first step of establishing a toolchain for generating configuration data to be embedded in a product to be deployed in a network, as indicated in block 132. For example, the toolchain may include a plurality of production levels. The process 130 also includes the step of employing a plurality of plug-in modules, as indicated in block 134. For example, each plug-in module may be configured to operate at one of the production levels for orchestrating one or more external production tools at the respective production level. Furthermore, the process 130 includes permitting bi-directional communication among the plug-in modules to coordinate the configuration data at the plurality of production levels, as indicated in block 136.

According to additional embodiments, the process 130 may further be defined whereby the configuration data may include microservice code for enabling the product to offer one or more microservices in the network. In some embodiments, the toolchain may be a deployment orchestration tool including at least a build tool and a runtime tool. Also, the deployment orchestration tool may further include one or more of a testing tool, a packaging tool, a deployment tool, an installation tool, a configuration tool, and a service life cycle management tool.

Furthermore, the process 130 may include steps of receiving a declarative configuration and then orchestrating the plug-in modules at the production levels to produce the configuration data based on the declarative configuration. Also, the process 130 may include the step of reusing the configuration data to be embedded in a plurality of products to be deployed in the network to allow the plurality of products to share build engine data. The process 130 may also include the step of maintaining a common look and feel on each product. In some embodiments, the toolchain may be a part of a DevOps pipeline.

Also, the process 130 may include the step of generating the configuration data to unify one or more of cross-platforms, libraries, configurable packages, programming languages, build tools, orchestration tools, dependency tools, software development tools, Continuous Integration (CI) tools, and runtime configuration management tools under a common configuration model. For example, CI tools in software design, may refer to the practice of merging working copies of a number of software developers into a shared workflow, which may be updated at any suitable frequency (e.g., several times a day). The process 130 may also include selecting services and platforms based on build, dependency management, test harness, Life Cycle Management (LCM), languages, source code management, build orchestration, and package delivery.

Therefore, according to the various embodiments described in the present disclosure, certain points of novelty may be evident with respect to conventional build tools. The present systems and methods are enabled to make cross-platform and reusable software, which can be an important feature for making and maintaining software/hardware systems that can produce business value. Many conventional attempts to solve this problem involve adding domain specific tools to solve specific portions of the problem, such as configurable packages (e.g., Autotools, CMake), specifically designed programming languages (e.g., Java), generic build and integration tools (e.g., Jenkins), build orchestration tools (e.g., BitBake), software deployment tools (e.g., package managers), and runtime configuration management (e.g., Ansible, Kubernetes). However, often these tools have their own specific requirements and configuration formats. Maintaining these conventional systems may require significant effort to write build/test/runtime middleware (software glue) code/configurations in a wide variety of formats.

The present disclosure is configured to unify the aforementioned software development and deployment concerns under the conventional configuration model. Particularly, the present disclosure describes systems and methods having an accompanying deployment orchestrator to consume this data to build, test, deploy, and configure running instances.

Work in the disaggregation of software services based on standardized protocols and messaging schemas has resulted in tremendous flexibility for reusing software across multiple platforms. Code formerly had compile time dependencies on other code (via headers and shared memory models) and platforms (O/S dependent calls). The use of an OS Abstraction Layer and schema driven message-based APIs and data-driven features, as described in the present embodiments, have enabled code to be written once and used in a variety of platforms with little to no changes and no direct compile-time dependencies. For example, the OS Abstraction Layer may provide an Application Programming Interface (API) to an abstract operating system making it easier and quicker to develop code for multiple software or hardware platforms. OS abstraction layers can present an abstraction of a common system functionality that is offered by any operating system. In some cases, the OS Abstraction Layer may also provide a hardware abstraction layer, which may be configured to include an interface to hardware devices, including, for example, memory, I/O ports, etc.

The present disclosure is configured to build on and provide a way to manage such disaggregated platform-agnostic software without resorting to large product-specific amounts of code, scripts, procedures, and processes. It also allows a user to customize the depth and usage of the deployment orchestration data used at every level. The depth may also be extended or subdivided to other layers, even those not yet imagined.

With the decoupling of build-time dependencies possible with modern microservices, runtime instances can be constructed dynamically by packaging of services into a user-defined deployment using only data. This simultaneously maximizes software flexibility and minimizes developer effort when developing and managing platforms.

The deployment data is automatically constructed from multiple sources. For example, services (or microservices) can define dependencies to drive life-cycle management, messaging contracts, and plug-in support. Services can also define a hardware platform/architecture that can define the required binary code formats. Also defined is a deployment architecture that defines the services and capabilities present on a platform.

Deployment data can be patched in different ways—merged, replaced, deleted, staged, and also validated, according to the normal rules of a declarative config-based solution. The present disclosure describes embodiments that use a common source of data to describe a deployment, such as services, deployment options, dependencies, and packaging rules. Also, various embodiments may use this information both at build time (to drive configuration, build, and packaging in the build and CI systems) and at runtime (to drive platform level lifecycle management of deployed services).

The present embodiments allow an arbitrary set of microservices to be selected, configured, built, installed, deployed, and managed, from a single source, with no code or script changes required. This may be important to enable efficiency in development and testing but can also open up new possibilities for deployed services to be more reactive to deployment configuration changes. Using the data driven config, deployments can be copied from a running system and moved to simulated layers to reproduce a running or snapshotted deployment, and vice versa. For cases where generated build artifacts (e.g., configure files, recipes, artifacts, executables) need to be exported or shared with other systems that do not use deployment orchestration natively, the artifacts can be generated on demand and cached for use externally.

The deployment tools/engines (e.g., deployment orchestrator 24, deployment systems 30, 50, 60, etc.) of the present disclosure may be able to work in an ecosystem, run as a microservice, and interact with other services. For example, the present deployment tools/engines may interact with other services, such as Continuous Integration (CI), build scheduling, nearest neighbor testing, report generation, etc. The present deployment tools/engines do not need to solve problems all over again for different products. The plug-in modules 52 may be configured to allow the deployment tools to interact with other existing tools to do the work it needs to do. The plug-in modules 52 may interact and/or incorporate various embodiments of build plug-ins (e.g., Yocto, BitBake, Kubernetes, etc.), runtime monitoring tools (e.g., Prometheus, elasticSearch, dye tracing, Ittng, Kafka, etc.), and other external tools.

Differences between the embodiments of the present disclosure and conventional systems may be detectable by various observations. For example, the present embodiments include a single source of a detailed configuration information visible at many different levels or layers. Also, the embodiments of the present disclosure may exhibit a lack of conventional handcrafted software glue or middleware. Also, the present disclosure may result in processes having the ability to easily deploy products and upgrade multiple configurations that may be easy to notice compared with conventional systems.

Some of benefits of the present embodiments include a great reduction or need for custom middleware for each testing deployment. Also, the present embodiments make each new configuration easy to understand, consume, and distribute. Internally, this represents a large potential efficiency increase for developing and testing in microservice models on different platforms. From a customer perspective, this can also reduce processor loading when deployment orchestrators have the ability to change what services are built and deployed based on configuration data. This also allows common services to be more easily used across different platforms and can increase the common look and feel for integration with common microservices. The present disclosure also provides the ability to capture and replicate in-field deployments in local sandboxes for testing.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, enable a processing device to:
   establish a toolchain for generating configuration data to be embedded in a product to be deployed in a network, the toolchain including a plurality of production levels;
   employ a plurality of plug-in modules, each plug-in module configured to operate at one production level of the plurality of production levels for orchestrating one or more external production tools at the respective production level; and
   permit bi-directional communication among the plug-in modules to coordinate the configuration data at the plurality of production levels.

2. The non-transitory computer-readable medium of claim 1, wherein the configuration data includes microservice code for enabling the product to offer one or more microservices in the network.

3. The non-transitory computer-readable medium of claim 1, wherein the toolchain is a deployment orchestration tool including at least a build tool and a runtime tool.

4. The non-transitory computer-readable medium of claim 3, wherein the deployment orchestration tool further includes one or more of a testing tool, a packaging tool, a deployment tool, an installation tool, a configuration tool, and a service life cycle management tool.

5. The non-transitory computer-readable medium of claim 1, wherein the instructions further enable the processing device to receive a declarative configuration and orchestrate the plug-in modules at the production levels to produce the configuration data based on the declarative configuration.

6. The non-transitory computer-readable medium of claim 1, wherein the instructions further enable the processing device to reuse the configuration data to be embedded in a plurality of products to be deployed in the network to allow the plurality of products to share build engine data.

7. The non-transitory computer-readable medium of claim 6, wherein the instructions further enable the processing device to maintain a common look and feel on each product.

8. The non-transitory computer-readable medium of claim 1, wherein the toolchain is a part of a DevOps pipeline.

9. The non-transitory computer-readable medium of claim 1, wherein the instructions further enable the processing device to generate the configuration data to unify one or more of cross-platforms, libraries, configurable packages, programming languages, build tools, orchestration tools, dependency tools, software development tools, Continuous Integration (CI) tools, and runtime configuration management tools under a common configuration model.

10. The non-transitory computer-readable medium of claim 1, wherein the instructions further enable the processing device to select services and platforms based on build, dependency management, test harness, Life Cycle Management (LCM), languages, source code management, build orchestration, and package delivery.

11. A system comprising:
a processing device, and
a memory device configured to store a computer program having instructions that, when executed, enable the processing device to
establish a toolchain for generating configuration data to be embedded in a product to be deployed in a network, the toolchain including a plurality of production levels;
employ a plurality of plug-in modules, each plug-in module configured to operate at one of the production levels for orchestrating one or more external production tools at the respective production level; and
permit bi-directional communication among the plug-in modules to coordinate the configuration data at the plurality of production levels.

12. The system of claim 11, wherein the configuration data includes microservice code for enabling the product to offer one or more microservices.

13. The system of claim 11, wherein the toolchain is a deployment orchestration tool including a build tool, a runtime tool, and one or more of a testing tool, a packaging tool, a deployment tool, an installation tool, a configuration tool, and a service life cycle management tool.

14. The system of claim 1, wherein the instructions further enable the processing device to receive a declarative configuration and orchestrate the plug-in modules at the production levels to produce the configuration data based on the declarative configuration.

15. A method comprising the steps of:
establishing a toolchain for generating configuration data to be embedded in a product to be deployed in a network, the toolchain including a plurality of production levels;
employing a plurality of plug-in modules, each plug-in module configured to operate at one of the production levels for orchestrating one or more external production tools at the respective production level; and
permitting bi-directional communication among the plug-in modules to coordinate the configuration data at the plurality of production levels.

16. The method of claim 15, further comprising the step of reusing the configuration data to be embedded in a plurality of products to be deployed in the network to allow the plurality of products to share build engine data.

17. The method of claim 16, further comprising the step of maintaining a common look and feel on each product.

18. The method of claim 15, wherein the toolchain is a part of a DevOps pipeline.

19. The method of claim 15, further comprising the step of generating the configuration data to unify one or more of cross-platforms, libraries, configurable packages, programming languages, build tools, orchestration tools, dependency tools, software development tools, Continuous Integration (CI) tools, and runtime configuration management tools under a common configuration model.

20. The method of claim 15, further comprising the step of selecting services and platforms based on information related to build, dependency management, test harnesses, Life Cycle Management (LCM), languages, source code management, build orchestration, and package delivery.

* * * * *